United States Patent
Higuchi et al.

(10) Patent No.: US 9,765,722 B2
(45) Date of Patent: Sep. 19, 2017

(54) FUEL INJECTION SYSTEM FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyoto-shi (JP)

(72) Inventors: Akihiko Higuchi, Toyota (JP); Tomohiro Nakano, Nagoya (JP); Rihito Kaneko, Miyoshi (JP); Eiji Murase, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/748,914

(22) Filed: Jun. 24, 2015

(65) Prior Publication Data

US 2015/0377172 A1 Dec. 31, 2015

(30) Foreign Application Priority Data

Jun. 25, 2014 (JP) .................................. 2014-130371

(51) Int. Cl.
*F02D 41/30* (2006.01)
*F02D 41/26* (2006.01)
(Continued)

(52) U.S. Cl.
CPC ......... *F02D 41/3005* (2013.01); *F02D 41/26* (2013.01); *F02D 41/3094* (2013.01);
(Continued)

(58) Field of Classification Search
CPC ..... F02D 41/3005; F02D 41/26; F02M 51/06; F02M 61/10
See application file for complete search history.

(56) References Cited

U.S. PATENT DOCUMENTS 6,244,241 B1 6/2001 Mamiya et al.
2008/0135014 A1 6/2008 Blessing et al.
(Continued)

FOREIGN PATENT DOCUMENTS

JP   11-343911       12/1999
JP   2008-121429 A   5/2008
(Continued)

*Primary Examiner* — Hung Q Nguyen
*Assistant Examiner* — Xiao Mo
(74) *Attorney, Agent, or Firm* — Oblon, McClelland, Maier & Neustadt, L.L.P.

(57) ABSTRACT

A fuel injection system for an engine, the fuel injection system includes injectors and an electronic control unit. The injectors include needle valves; and the ECU is configured to: (i) execute partial lift injection and full lift injection with the injectors, the partial lift injection being injection during which the needle valve does not reach a fully-open state and the full lift injection being injection during which the needle valve reaches the fully-open state; (ii) operate the engine in a partial lift injection region where the injection of a required injection amount of a fuel is shared by the partial lift injection and the full lift injection; and (iii) perform the amount of correction of the required injection amount with respect to the injection amount shared by the full lift injection when the required injection amount is corrected while the engine is operated in the partial lift injection region.

8 Claims, 7 Drawing Sheets

(51) Int. Cl.
    *F02D 41/32*         (2006.01)
    *F02D 41/40*         (2006.01)
    *F02D 41/38*         (2006.01)
    *F02M 63/02*         (2006.01)
    *F02M 69/04*         (2006.01)

(52) U.S. Cl.
    CPC ........... *F02D 41/32* (2013.01); *F02D 41/402* (2013.01); *F02D 2041/389* (2013.01); *F02D 2200/063* (2013.01); *F02D 2200/101* (2013.01); *F02D 2200/1002* (2013.01); *F02M 63/029* (2013.01); *F02M 69/046* (2013.01); *Y02T 10/44* (2013.01)

(56) References Cited

U.S. PATENT DOCUMENTS

| | | | | |
|---|---|---|---|---|
| 2011/0247586 | A1* | 10/2011 | Zubeck | F02B 1/02 123/299 |
| 2014/0297159 | A1* | 10/2014 | Surnilla | F02D 41/3094 701/103 |
| 2014/0297162 | A1* | 10/2014 | Surnilla | F02D 41/3094 701/104 |
| 2014/0311459 | A1* | 10/2014 | Katsurahara | F02D 41/247 123/478 |

FOREIGN PATENT DOCUMENTS

| | | |
|---|---|---|
| JP | 2013-108422 A | 6/2013 |
| JP | 2013-181454 | 9/2013 |
| JP | 2013-199916 A | 10/2013 |
| JP | 2013-209938 A | 10/2013 |
| JP | 2013-234679 A | 11/2013 |
| WO | WO 2013/073111 A1 | 5/2013 |

\* cited by examiner

FUEL INJECTION SYSTEM FOR INTERNAL COMBUSTION ENGINE AND CONTROL METHOD FOR INTERNAL COMBUSTION ENGINE

INCORPORATION BY REFERENCE

The disclosure of Japanese Patent Application No. 2014-130371 filed on Jun. 25, 2014 including the specification, drawings and abstract is incorporated herein by reference in its entirety.

BACKGROUND OF THE INVENTION

1. Field of the Invention

The invention relates to a fuel injection system for an internal combustion engine and a control method for an internal combustion engine.

2. Description of Related Art

Some fuel injection systems for internal combustion engines perform micro fuel injection in order to improve exhaust properties. In improving the accuracy of the micro injection, an irregularity may arise in the injection amount of an injector. Bouncing occurring when a needle valve is fully open is one of the factors causing the irregularity of the injection amount of the injector. The effect of the bouncing of the needle valve on the injection accuracy relatively increases as the injection amount decreases. Accordingly, a lower limit attributable to the mechanism factor of the injector is present in the injection amount allowing injection accuracy to be ensured.

Japanese Patent Application Publication No. 2013-181454 proposes a technique for partial lift injection. The partial lift injection is fuel injection that is performed with the length of time that is required for the needle valve to be fully opened being shorter than energizing time for the injector. The partial lift injection allows a very small amount of fuel to be injected without being affected by the bouncing of the needle valve described above.

SUMMARY OF THE INVENTION

The range of the injection amount allowing injection accuracy to be ensured is narrower in the partial lift injection described above than in full lift injection allowing the needle valve to be fully opened. Accordingly, the injection accuracy of the micro injection may be reduced when a required injection amount is corrected and the injection amount of the partial lift injection is changed during the implementation of the partial lift injection-based micro injection. This may deteriorate the effect of improvement of exhaust properties.

The invention provides a fuel injection system for an internal combustion engine allowing micro injection to be performed with a high level of accuracy and a control method for an internal combustion engine.

A first aspect of the invention provides a fuel injection system for an internal combustion engine, the fuel injection system includes injectors and an electronic control unit. The injectors include needle valves. The electronic control unit is configured to (i) execute partial lift injection and full lift injection with the injectors, the partial lift injection being injection during which the needle valve does not reach a fully-open state and the full lift injection being injection during which the needle valve reaches the fully-open state; (ii) operate the internal combustion engine in a partial lift injection region where the injection of a required injection amount of a fuel is shared by the partial lift injection and the full lift injection; and (iii) correct an injection amount shared by the full lift injection with an amount of correction of the required injection amount when the required injection amount is corrected while the internal combustion engine is operated in the partial lift injection region.

According to the configuration described above, exhaust properties can be improved because the micro injection of the fuel is performed with a high level of accuracy by the partial lift injection. During the partial lift injection, an increase or decrease in the injection amount has a significant effect on the injection accuracy. Accordingly, the accuracy of the micro injection may be affected when the injection amount of the partial lift injection is changed by the correction of the required injection amount. Regarding this point, the correction of a required amount is applied to the injection amount shared by the full lift injection in a case where the correction of the required injection amount is required according to the configuration described above. Accordingly, the injection amount of the partial lift injection is maintained even when the required injection amount is corrected. As a result, the micro injection can be performed with a high level of accuracy.

In the fuel injection system described above, the electronic control unit may be configured to set energizing time of the injectors for the execution of the partial lift injection to the maximum value in a range of the energizing time allowing the execution of the partial lift injection when the partial lift injection is performed. According to the configuration described above, the irregularity of the injection amount of the micro injection can be minimized by the setting of the energizing time.

A lower limit that can be set is also present in the injection amount of the full lift injection. Accordingly, a decrease in the injection amount of the partial lift injection may be required when the manner of injection is maintained in a case where a significant amount-decreasing correction for the required injection amount is required. In the fuel injection system described above, the electronic control unit may be configured to allow the injection amount shared by the full lift injection to be injected after division into a plurality of the partial lift injections when the injection amount shared by the full lift injection falls short of a lower limit value of the injection amount of the full lift injection due to the correction of the required injection amount. According to the configuration described above, a further decrease in amount to be exceeded by the lower limit of the full lift injection can be applied to the injection amount shared by the full lift injection. Accordingly, a reduction in the injection accuracy of the partial lift injection-based micro injection is suppressed even when a significant amount-decreasing correction for the required injection amount is required.

In the fuel injection system described above, the electronic control unit may be configured to allow the injection amount of each of the partial lift injections to become the lower limit amount of the injection amount of the partial lift injection when the injection amount shared by the full lift injection is divided into the plurality of partial lift injections. According to the configuration described above, the calculation processing that is required for the fuel shared by the full lift injection to be injected by the partial lift injection can be simplified.

The injection amount preceding the division may differ from the sum of the injection amounts of the respective partial lift injections following the division depending on the manner of the division described above. In the fuel injection system described above, the electronic control unit may be configured to adjust the total of the injection amounts of the respective partial lift injections by a difference between the injection amounts when the injection amount difference arises between the injection amount shared by the full lift injection prior to the division and the total of the injection amounts of the respective partial lift injections following the division when the injection amount shared by the full lift injection is divided into the plurality of partial lift injections. According to the configuration described above, a change in the sum of the injection amounts of the overall injection can be inhibited.

In the fuel injection system described above, the injectors may include the port injector and the in-cylinder injector. The port injector may be configured to inject fuel into an intake port. The in-cylinder injector may be configured to inject fuel into a cylinder. The electronic control unit may be configured to execute the full lift injection by using the port injector, and the electronic control unit may be configured to execute the partial lift injection by using the in-cylinder injector. In the fuel injection system described above, the injectors may include an in-cylinder injector that may be configured to inject fuel into a cylinder. The electronic control unit may be configured to execute the full lift injection and the partial lift injection by using the in-cylinder injector.

A second aspect of the port injection provides a control method for an internal combustion engine, the internal combustion engine includes injectors. The injectors include needle valves. The control method includes executing partial lift injection and full lift injection with the injectors, the partial lift injection being injection during which the needle valve does not reach a fully-open state and the full lift injection being injection during which the needle valve reaches the fully-open state; operating the internal combustion engine in a partial lift injection region where the injection of a required injection amount of a fuel is shared by the partial lift injection and the full lift injection; and correcting an injection amount shared by the full lift injection with an amount of correction of the required injection amount when the required injection amount is corrected while the internal combustion engine is operated in the partial lift injection region.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
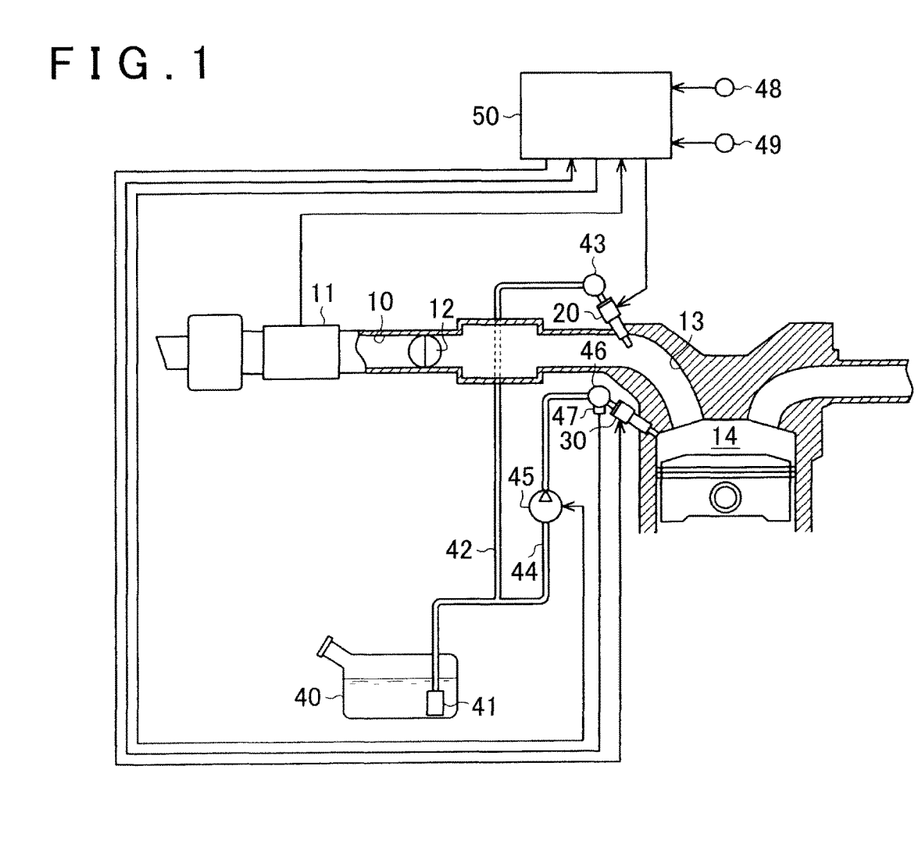
FIG. 1 is a schematic diagram illustrating the configuration of a fuel injection system for an internal combustion engine according to a first embodiment.

Hereinafter, a first embodiment of a fuel injection system for an internal combustion engine will be described in detail with reference to FIGS. 1 to 5. As illustrated in FIG. 1, an air flow meter 11 and a throttle valve 12 are disposed, in order from an upstream side of an intake passage 10, in the intake passage 10 of an internal combustion engine. The air flow meter 11 is configured to detect an intake air amount. The throttle valve 12 is configured to adjust the intake air amount. The intake passage 10 branches on a downstream side of the throttle valve 12 and is connected to combustion chambers 14 for respective cylinders via intake ports 13.

The fuel injection system for an internal combustion engine according to this embodiment is provided with two types of injectors, one being port injectors 20 and the other being in-cylinder injectors 30. The port injectors 20 for fuel injection into the intake ports 13 are arranged in the respective intake ports 13 for the respective cylinders. The in-cylinder injectors 30 for fuel injection into the cylinders are arranged in the respective cylinders.

A feed pump 41 that pumps a fuel is arranged in a fuel tank 40 of the fuel injection system. The feed pump 41 is connected to a low-pressure fuel pipe 43 via a low-pressure fuel passage 42. The fuel that is pumped by the feed pump 41 is stored in the low-pressure fuel pipe 43. The port injectors 20 for the respective cylinders are connected to the low-pressure fuel pipe 43.

A high-pressure fuel passage 44 branches from the middle of the low-pressure fuel passage 42. A high-pressure fuel pump 45, which further pressurizes and discharges the fuel pumped by the feed pump 41, is disposed in the high-pressure fuel passage 44. The high-pressure fuel passage 44 is connected to a high-pressure fuel pipe 46. The fuel that is pressurized by the high-pressure fuel pump 45 is stored in the high-pressure fuel pipe 46. The in-cylinder injectors 30 for the respective cylinders are connected to the high-pressure fuel pipe 46. A fuel pressure sensor 47 is arranged in the high-pressure fuel pipe 46. The fuel pressure sensor 47 detects the pressure of the fuel stored in the high-pressure fuel pipe 46, that is, the pressure of the fuel supplied to the in-cylinder injectors 30.

The internal combustion engine that is provided with the fuel injection system according to this embodiment is controlled by electronic control unit 50. The electronic control unit 50 also implements fuel injection system control as part of the internal combustion engine control. Detection signals from various sensors are input into the electronic control unit 50. The sensors include not only the air flow meter 11 and the fuel pressure sensor 47 described above but also, for example, a crank angle sensor 48 and a water temperature sensor 49. The crank angle sensor 48 outputs a crank angle signal that is used to calculate an engine rotation speed. The water temperature sensor 49 detects the temperature of an engine coolant. The electronic control unit 50 executes various types of control by driving the port injectors 20, the in-cylinder injectors 30, the high-pressure fuel pump 45, and the like based on the detection signals from the sensors.

For example, the electronic control unit 50 controls the fuel injection from the port injectors 20 and the in-cylinder injectors 30 as one of the controls. During the fuel injection control, a required injection amount that depends on the current operation situation of the internal combustion engine is calculated and the energization of the port injectors 20 and the in-cylinder injectors 30 is controlled so that the same amount of the fuel as the required injection amount is injected.

The accuracy of the injection amount control during the fuel injection control described above is also related to the mechanical structure of the port injectors 20 and the in-cylinder injectors 30. Herein, the structure of the injectors will be described by using the in-cylinder injectors 30 as an example.

Figure 2:
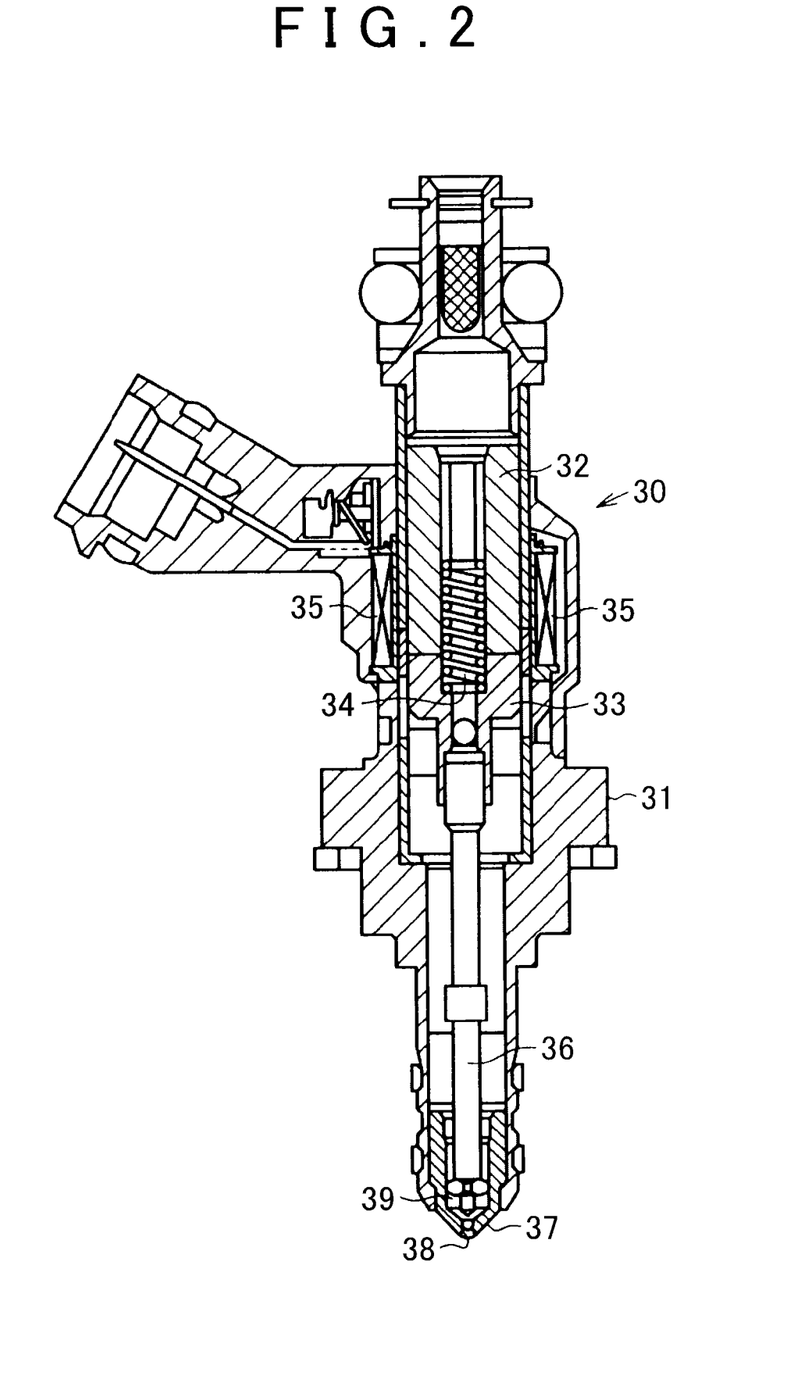
FIG. 2 is a sectional view of an in-cylinder injector that is disposed in this embodiment.

As illustrated in FIG. 2, a fixed core 32 is fixed to a part in a housing 31 of the in-cylinder injector 30 that is illustrated in the upper section of the drawing. A coil 35 is arranged at an outer circumferential part of the fixed core 32. The coil 35 magnetizes the fixed core 32 in response to energization.

A movable core 33 is disposed, to be slidable in the vertical direction of the drawing, at a position in the housing 31 that is adjacent to the fixed core 32. A needle valve 36 is connected to the movable core 33. The needle valve 36 is displaced along with the movable core 33. A spring 34 causes the movable core 33 to remain biased toward the lower section of the drawing, that is, in a direction away from the fixed core 32.

A nozzle body 37 that surrounds a tip part of the needle valve 36 is attached to a tip portion (part in the lower section of the drawing) of the housing 31. An elongated slit-shaped injection hole 38, which allows the inside and the outside of the nozzle body 37 to communicate with each other, is formed in a tip portion of the nozzle body 37. A fuel chamber 39 is formed between the needle valve 36 and the nozzle body 37. The fuel chamber 39 is connected to the high-pressure fuel pipe 46 described above. The high-pressure fuel that is stored in the high-pressure fuel pipe 46 is introduced into the fuel chamber 39.

The energization of the coil 35 causes the fixed core 32 to be magnetized in the in-cylinder injector 30 and the movable core 33 to be pulled to the Fixed core 32 against the biasing force of the spring 34. Then, the needle valve 36 is separated (lifted) from the injection hole 38 to be opened and the fuel introduced into the fuel chamber 39 is injected to the outside through the injection hole 38. The needle valve 36 is in a fully-open state when the movable core 33 abuts against the fixed core 32 as in the state illustrated in FIG. 2.

When the coil 35 is not energized, the movable core 33 is separated from the fixed core 32 due to the biasing force of the spring 34. Then, the needle valve 36 abuts against the nozzle body 37 and the injection hole 38 is blocked. Then, the fuel injection from the in-cylinder injector 30 is stopped.

Figure 3:
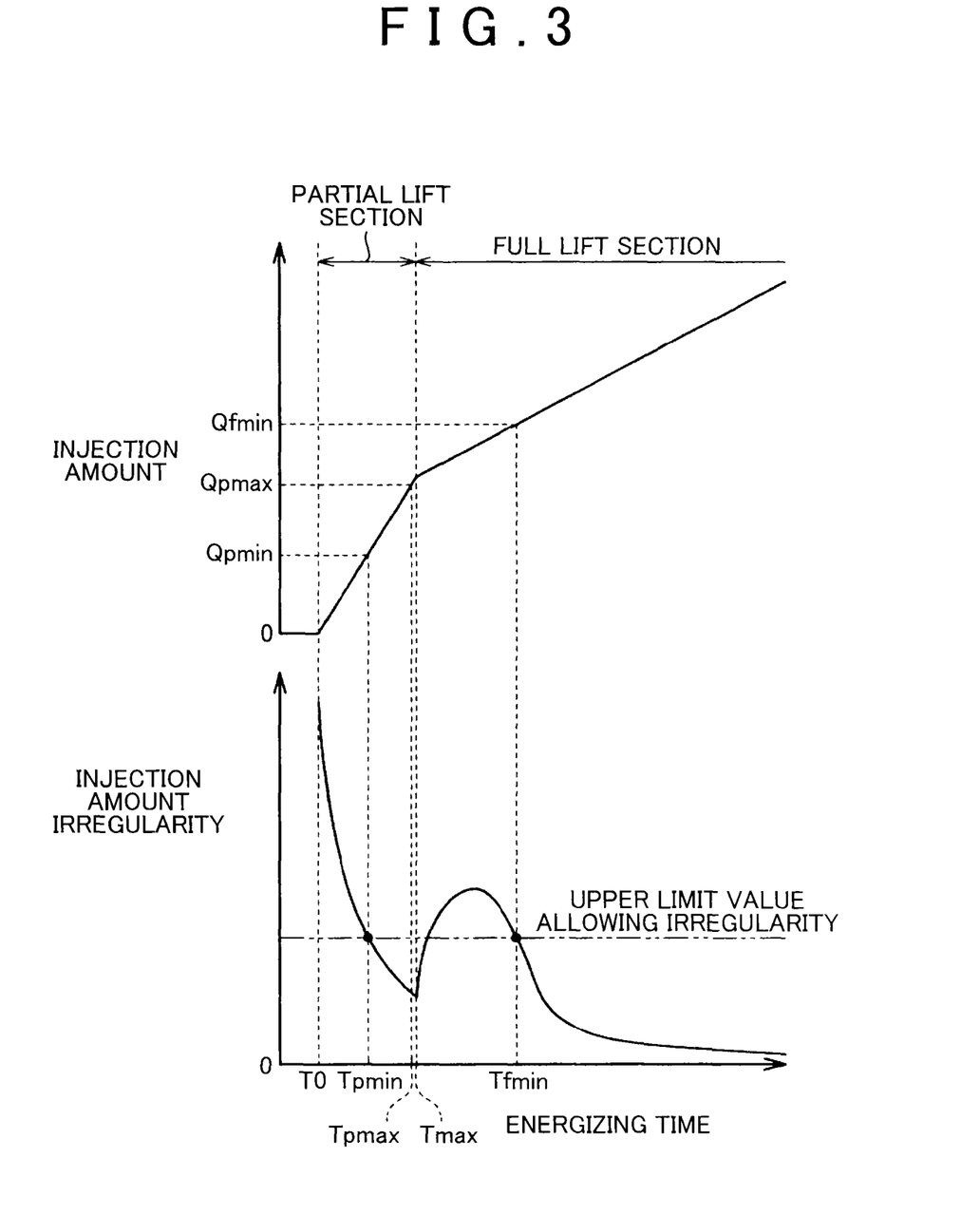
FIG. 3 is graphs illustrating the injection amount of the in-cylinder injector that is disposed in this embodiment and a change in the irregularity of the injection amount with respect to energizing time.

FIG. 3 illustrates a relationship between the length of time during which the coil 35 of the in-cylinder injector 30 is energized and the injection amount and a relationship between the energizing time and the irregularity of the injection amount. In FIG. 3, "T0" represents the energizing time that is required for the initiation of the lifting of the needle valve 36 and "Tmax" represents the energizing time that is required for the needle valve 36 to be fully opened. In the T0 to Tmax section, the maximum lift of the needle valve 36 during the energization changes, and thus the rate of change in the injection amount with respect to the energizing time is high. In the following description, the energizing time section from T0 to Tmax, during which the needle valve 36 does not reach the fully-open state, will be described as a partial lift section. In the following description, the energizing time section that follows the Tmax, at which the needle valve 36 reaches the fully-open state, will be described as a full lift section.

The diagram showing the injection amount irregularity shows that the injection amount irregularity decreases with an increase in the energizing time in the partial lift section but temporarily increases immediately after the energizing time enters the full lift section. This is because the needle valve 36 reaches the fully-open state when the movable core 33 abuts against the fixed core 32 but bouncing occurs in the needle valve 36 due to a reaction to the abutting in that case. The pulsation of the lift amount of the needle valve 36 attributable to the bouncing increases the injection amount irregularity.

The effect of the bouncing of the needle valve 36 relatively decreases in response to an increase in the energizing time, that is, an increase in the injection amount. Accordingly, the injection amount irregularity temporarily increases immediately after the initiation of the full lift section and then decreases in response to an increase in the energizing time. The injection amount irregularity can be suppressed to or below an allowable upper limit value when the energizing time is set to at least specified time (minimum energizing time for F/L injection Tfmin) exceeding the Tmax and the fuel injection (full lift injection) allowing the needle valve 36 to reach the fully-open state is performed.

Even in the partial lift section during which the needle valve 36 does not reach the fully-open state as described above, the injection amount irregularity is relatively small at the energizing time immediately preceding the full lift section. Accordingly, the injection amount irregularity is suppressed to or below the allowable upper limit value even when the fuel injection is performed with the energizing time set to be equal to or longer than specified time (minimum energizing time for P/L injection Tpmin) and fall short of the Tmax. In other words, high-accuracy micro fuel injection can be performed when the fuel injection not allowing the needle valve 36 to reach the fully-open state, that is, so-called partial lift injection, is performed with the energizing time set to be equal to or longer than the specified time (minimum energizing time for P/L injection Tpmin) and fall short of the Tmax. When the energizing time for the coil 35 of the in-cylinder injector 30 is set to the Tmax, which is the maximum value in the range of the energizing time in which the partial lift injection can be implemented (partial lift section), the injection amount irregularity has the minimum value available during the partial lift injection.

As illustrated in the drawing of FIG. 3 showing the injection amount irregularity, the injection amount irregularity significantly changes, as the energizing time increases or decreases, in the partial lift section. Accordingly, the range of the energizing time in which the injection amount irregularity can be suppressed to or below the allowable upper limit value in the partial lift section is extremely narrow.

Basically, the port injector 20 has a structure similar to that of the in-cylinder injector 30. The port injector 20 has an energizing time-injection amount irregularity relationship analogous to that of the in-cylinder injector 30.

In the fuel injection system according to this embodiment, the injection of the same amount of the fuel as the required injection amount is shared by the partial lift injection and the full lift injection in a specific operating range of the internal combustion engine. In this manner, the properties of the exhaust from the internal combustion engine are improved.

In the following description, the operating range of the internal combustion engine in which the partial lift injection and the full lift injection share the fuel injection will be described as a partial lift injection region. The fuel injection shared by the partial lift injection and the full lift injection can also be performed in the entire operating range of the internal combustion engine. In this case, the partial lift injection region is the entire operating range of the internal combustion engine. In the fuel injection system according to this embodiment, both the partial lift injection and the full lift injection in the partial lift injection region are performed from the in-cylinder injector 30. In other words, both the partial lift injection and the full lift injection in the partial lift injection region are performed by in-cylinder injection.

A lower limit value (minimum P/L injection amount Qpmin) and an upper limit value (maximum P/L injection amount Qpmax) for ensuring injection accuracy are set in the injection amount of the partial lift injection from the in-cylinder injector 30 (P/L injection amount Qp). The injection amount of the in-cylinder injector 30 available when the energization is performed for the minimum energizing time for P/L injection Tpmin is set for the minimum P/L injection amount Qpmin. The injection amount of the in-cylinder injector 30 available when the energization is performed for the maximum value of the energizing time in the partial lift section (maximum energizing time for P/L injection Tpmax) is set for the maximum P/L injection amount Qpmax. The maximum energizing time for P/L injection Tpmax is set to time that is obtained by subtracting the margin at which the needle valve 36 is sure not to reach the fully-open state from the Tmax.

A lower limit value (minimum F/L injection amount Qfmin) for ensuring injection accuracy is set in the injection amount of the full lift injection from the in-cylinder injector 30 (F/L injection amount Qf). The injection amount of the in-cylinder injector 30 available when the energization is performed for the minimum energizing time for F/L injection Tfmin is set for the minimum F/L injection amount Qfmin.

When the pressure of the fuel supply to the in-cylinder injector 30 changes, the relationship between the energizing time and the injection amount also changes. Even at the same energizing time, the injection amount of the in-cylinder injector 30 increases when the fuel supply pressure is high and decreases when the fuel supply pressure is low. Accordingly, the values of the minimum P/L injection amount Qpmin, the maximum P/L injection amount Qpmax, and the minimum F/L injection amount Qfmin are calculated one after another based on the result of the detection by the fuel pressure sensor 47.

Figure 4A:
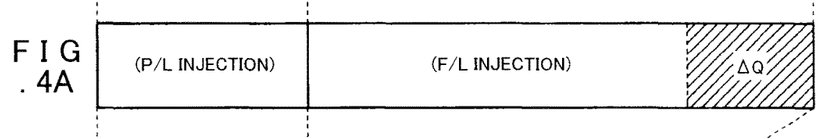
FIGS. 4A to 4F are diagrams illustrating a change in the manner of implementation of fuel injection following an amount-decreasing correction for a required injection amount in a partial lift injection region of the fuel injection system according to this embodiment.
Figure 4B:
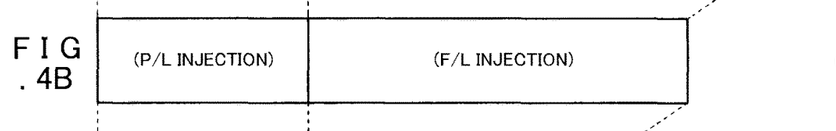

The manner of implementation of the fuel injection in the partial lift injection region will be described in detail with reference to FIGS. 4A to 4F. In a case where the required injection amount Q is not required to be corrected in the partial lift injection region in this embodiment, the in-cylinder injection-based partial lift injection for the P/L injection amount Qp and the in-cylinder injection-based full lift injection for the F/L injection amount Qf are performed as illustrated in FIG. 4B. In this case, the P/L injection amount Qp and the F/L injection amount Qf are respectively set so that the sum of the P/L injection amount Qp and the F/L injection amount Qf is equal to the required injection amount Q set in accordance with the engine operation state (engine rotation speed, engine load). In this embodiment, the P/L injection amount Qp is fixed to the maximum P/L injection amount Qpmax so that the irregularity of the P/L injection amount Qp is minimized. Accordingly, the value that is obtained by subtracting the maximum P/L injection amount Qpmax from the required injection amount Q is set for the F/L injection amount Qf for this case.

During the fuel injection control, various types of corrections with respect to the required injection amount Q, such as air-fuel ratio feedback correction and purge correction, are performed in accordance with the internal combustion engine operation situation. The air-fuel ratio feedback correction is a correction of the required injection amount Q for reducing the deviation between a target air-fuel ratio and an actual air-fuel ratio. The purge correction is a correction of the required injection amount Q that is performed to decrease the injection amount by the same amount as the amount of the vapor flowing into the combustion chamber 14 along with the air intake when the vapor of the fuel generated in the fuel tank 40 is purge-processed during the air intake.

As described above, the injection amount irregularity significantly changes, as the energizing time increases or decreases, in the partial lift section. Accordingly, the injection accuracy may be reduced when the P/L injection amount Qp is increased or decreased in accordance with the correction of the required injection amount Q.

Figure 4C:
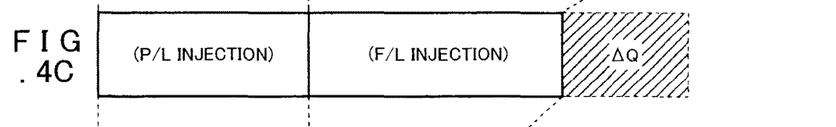
Figure 4D:
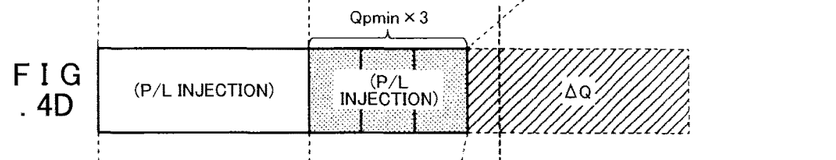

In a case where the correction of the required injection amount Q is required during the operation of the internal combustion engine in the partial lift injection region in this embodiment, the correction of the required amount is preferentially applied to the F/L injection amount Qf, that is, the injection amount shared by the full lift injection. In other words, in a case where an amount-increasing correction of the required injection amount Q is required, the F/L injection amount Qf is increased by the correction amount $\Delta Q$ with the P/L injection amount Qp maintained at the maximum P/L injection amount Qpmax as illustrated in FIG. 4A. In a case where an amount-decreasing correction of the required injection amount Q is required and the amount of the amount-decreasing correction is not significantly large, the F/L injection amount Qf is decreased by the correction amount $\Delta Q$ with the P/L injection amount Qp maintained at the maximum P/L injection amount Qpmax as illustrated in FIG. 4C.

When a large amount of the vapor is introduced during the air intake due to the purge processing of the fuel vapor, a significant decrease in the required injection amount Q is required due to the purge correction. When the amount-decreasing correction of the required amount is applied in entirety to the F/L injection amount Qf in this case, the F/L injection amount Qf may be exceeded by the minimum F/L injection amount Qfmin as the lower limit of the injection amount of the full lift injection. In this case, the F/L injection amount Qf of the fuel is divided to be injected by a plurality of partial lift injections instead of the full lift injection, that is, in a case where the F/L injection amount Qf falls short of the minimum F/L injection amount Qfmin as a result of the correction of the required injection amount Q. In other words, each of the P/L injection amount Qp of the fuel and the F/L injection amount Qf of the fuel is injected by the partial lift injection from the in-cylinder injector 30 in this case.

In this embodiment, the division of the F/L injection amount Qf for the plurality of partial lift injections in this case is performed so that the injection amount of each partial lift injection following the division becomes the minimum P/L injection amount Qpmin. For example, the F/L injection amount Qf of the fuel is divided for three partial lift injections at the minimum P/L injection amount Qpmin in the example of FIG. 4D.

Figure 4E:
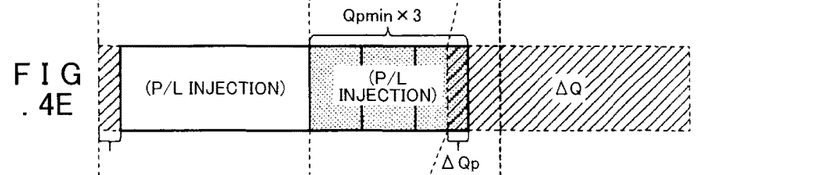
Figure 4F:
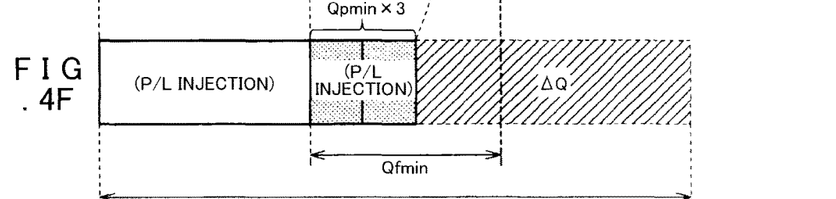

The total amount of the injection amounts of the partial lift injections following the division in this case is adjusted by increasing or decreasing the number of the partial lift injections. When the F/L injection amount Qf is further decreased from the case of FIG. 4D, for example, the number of the partial lift injections having the minimum P/L injection amount Qpmin as the injection amount thereof is decreased from three times to twice as illustrated in FIG. 4F.

In this case, the sum of the injection amounts following the division can be set to only a multiple of the minimum P/L injection amount Qpmin, and thus the F/L injection amount Qf following the division and the sum of the injection amounts following the division into the partial lift injections may differ from each other. In this embodiment, the P/L injection amount Qp is adjusted by the injection amount difference (ΔQp) therebetween as illustrated in FIG. 4E in a case where the difference arises. In this embodiment, the P/L injection amount Qp is set to the maximum P/L injection amount Qpmax and an adjustment toward the amount-increasing side equal to or exceeding the maximum P/L injection amount Qpmax is not performed. Accordingly, in this case, the number of partial lift injections following the division is set for the sum of the injection amounts of the partial injections following the division to become at least the F/L injection amount Qf so that the adjustment of the P/L injection amount Qp is always performed on the amount-decreasing side.

Figure 5A:
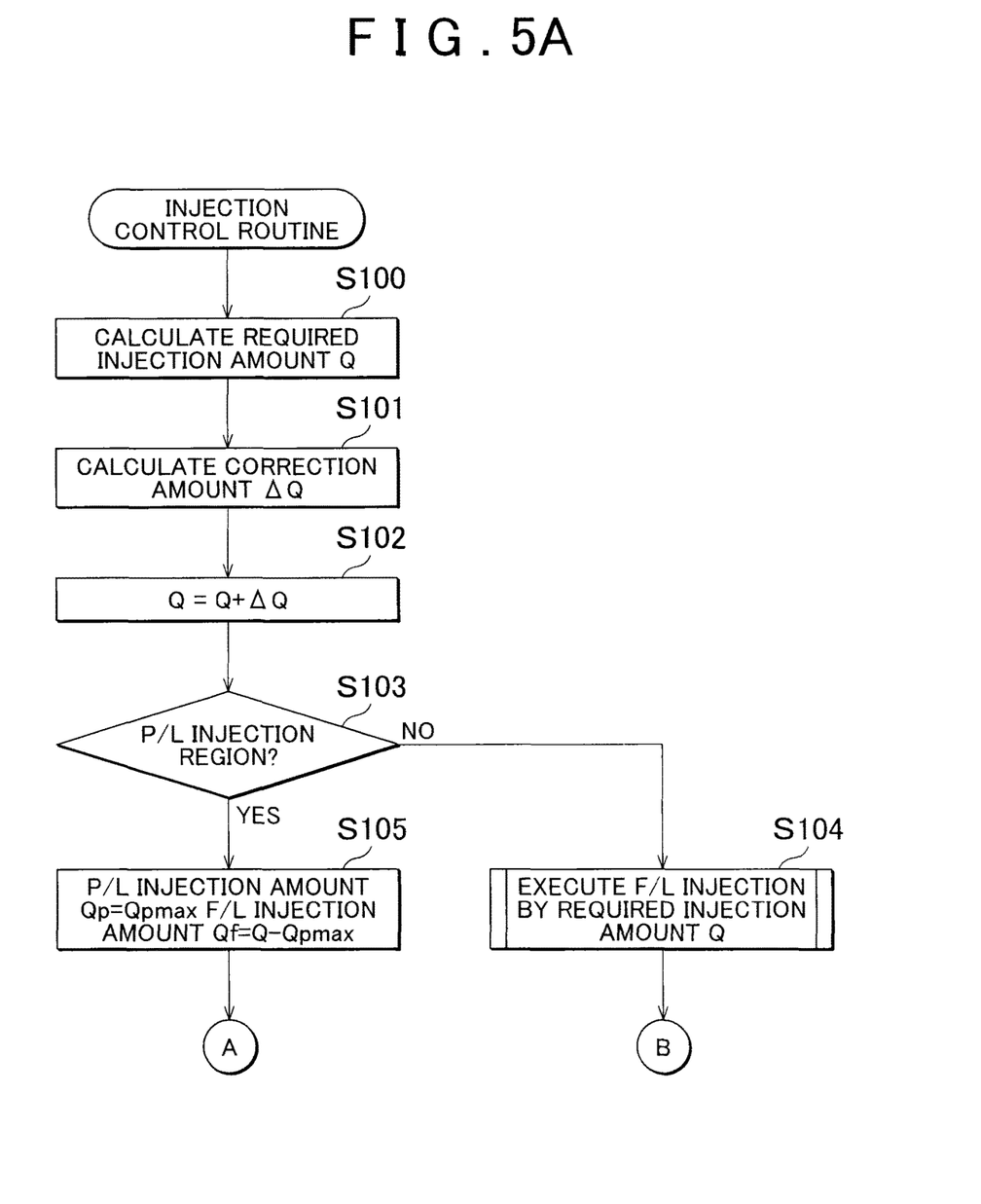
FIGS. 5A and 5B constitute a flowchart illustrating a processing procedure for an injection control routine that is executed in the fuel injection system according to this embodiment.

FIG. 5A illustrates a processing procedure for an injection control routine that is executed in the fuel injection system according to this embodiment. The processing of this routine is executed by the electronic control unit 50 during the fuel injection from each cylinder. When the processing of this routine is initiated, the required injection amount Q is first calculated in Step S100 based on the engine rotation speed and the engine load. Then, in Step S101, the calculation of the correction amount ΔQ with respect to the required injection amount Q is performed. Then, in Step S102, the required injection amount Q is corrected with the correction amount ΔQ calculated in Step S101. The correction amount ΔQ is the expression of the sum of various and individually-calculated correction amounts in which the amount-increasing side is the positive side.

Next, in Step S103, it is determined whether or not the current operating range of the internal combustion engine is the partial lift injection region. When the current operating range of the internal combustion engine is not the partial lift injection region (S103: NO), the processing proceeds to Step S104 and the full lift injection-based fuel injection by the required injection amount Q is executed. Then, the processing of this round of routine is terminated. The specific manner of injection pertaining to this case, that is, whether the full lift injection is to be performed by in-cylinder injection or port injection, depends on the operation condition of the internal combustion engine and the type of the internal combustion engine. In a case where the partial lift injection region is the entire operating range of the internal combustion engine, the processing proceeds to Step S105 after the processing of Step S102 with the processing of Step S103 and Step S104 omitted.

When the current operating range of the internal combustion engine is the partial lift injection region (S103: YES), the processing proceeds to Step S105. Then, the P/L injection amount Qp and the F/L injection amount Qf are calculated in Step S105. As described above, the P/L injection amount Qp is set to the maximum P/L injection amount Qpmax and the F/L injection amount Qf is set to the value that is obtained by subtracting the maximum P/L injection amount Qpmax from the required injection amount Q. Since the P/L injection amount Qp is fixed to the maximum P/L injection amount Qpmax, the correction of the correction amount ΔQ calculated in Step S101 is applied in entirety to the F/L injection amount Qf.

Figure 5B:
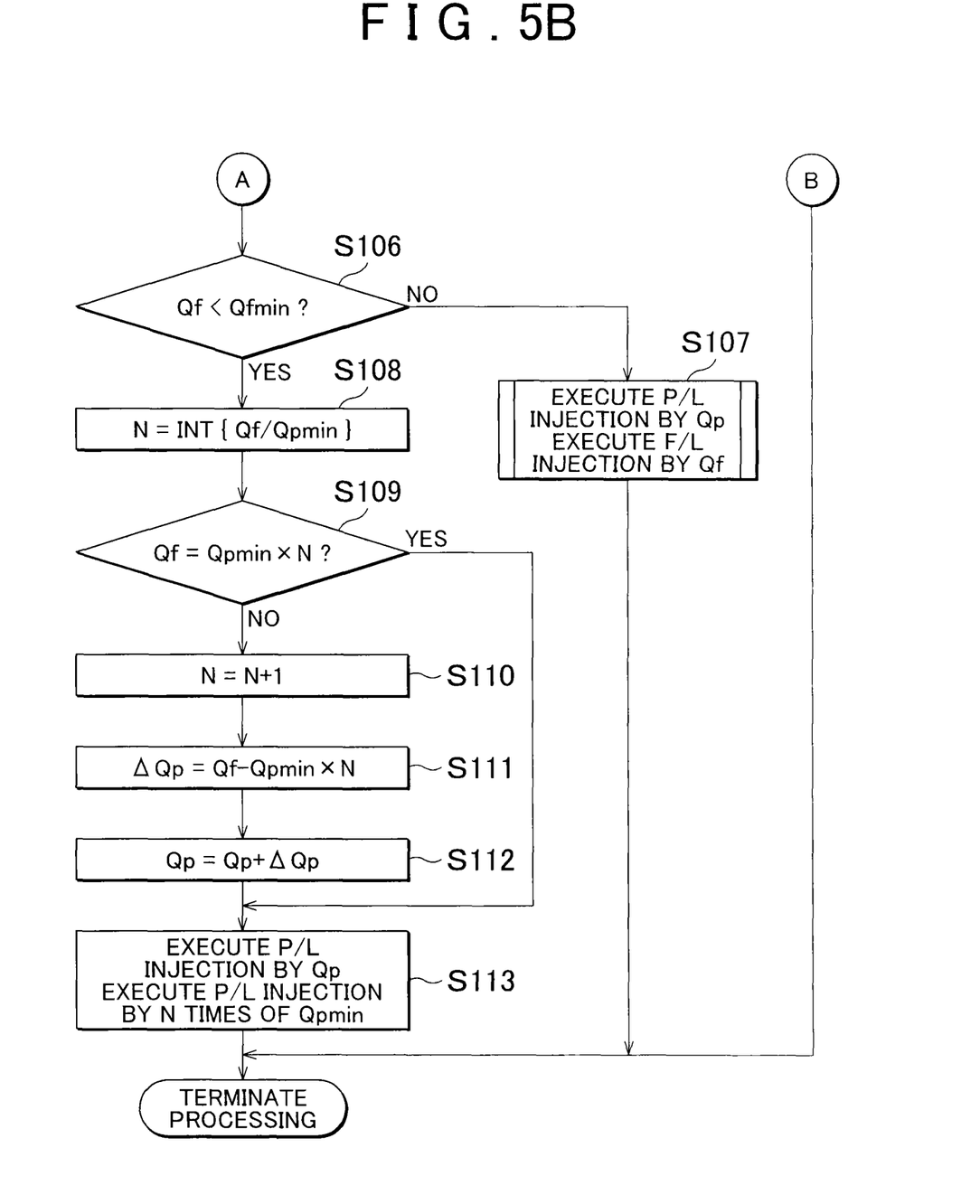

Next, as illustrated in FIG. 5B, in Step S106, it is determined whether or not the F/L injection amount Qf calculated in Step S105 is exceeded by the minimum F/L injection amount Qfmin. When the F/L injection amount Qf is not exceeded by the minimum F/L injection amount Qfmin (S106: NO), the processing proceeds to Step S107. In Step S107, each of the partial lift injection by the P/L injection amount Qp and the full lift injection by the F/L injection amount Qf is executed by in-cylinder injection, and then the processing of this round of routine is terminated.

The processing proceeds to Step S108 when the F/L injection amount Qf is exceeded by the minimum F/L injection amount Qfmin (S106: NO). In Step S108, a dividing number N is calculated. The dividing number N is calculated as the whole number part of the value that is obtained by dividing the F/L injection amount Qf by the minimum P/L injection amount Qpmin. Then, in Step S109, it is determined whether or not the product of the minimum P/L injection amount Qpmin and the dividing number N is equal to the F/L injection amount Qf, that is, whether or not the F/L injection amount Qf is divisible by the minimum P/L injection amount Qpmin. When the F/L injection amount Qf is divisible by the minimum P/L injection amount Qpmin (S109: YES), the processing proceeds to Step S113 with the processing of Step S110, Step S111, and Step S112 skipped. In this case, the partial lift injection by the P/L injection amount Qp calculated in Step S105, that is, the maximum P/L injection amount Qpmax, and N times of the partial lift injections each by the minimum P/L injection amount Qpmin are executed by in-cylinder injection in Step S113. Then, the processing of this round of routine is terminated.

When the F/L injection amount Qf is not divisible by the minimum P/L injection amount Qpmin (S109: NO), the processing proceeds to Step S113 after the processing of Step S110, Step S111, and Step S112. In other words, "1" is added to the value of the dividing number N in Step S110. In Step S111, the P/L injection adjustment amount ΔQp is calculated as the value (Qf−Qpmin×N) that is obtained by subtracting the product of the dividing number N following the addition and the minimum P/L injection amount Qpmin from the F/L injection amount Qf. In Step S112, an amount-decreasing adjustment of the P/L injection amount Qp by the P/L injection adjustment amount ΔQp is performed. During the processing of Step S113, the partial lift injection by the P/L injection amount Qp following the amount-decreasing adjustment described above and "N" times of the partial lift injections by the minimum P/L injection amount Qpmin are executed by in-cylinder injection. Then, the processing of this round of routine is terminated. In this case, the injection amount difference arises between the injection amount shared by the full lift injection prior to the division (F/L injection amount Qf) and the sum of the injection amounts of the partial lift injections following the division (minimum P/L injection amount Qpmin×N). In this case, the injection amount difference is obtained as the P/L injection adjustment amount ΔQp and the P/L injection amount Qp is adjusted by the injection amount difference.

Next, an effect of the fuel injection system according to this embodiment will be described. When the operating range of the internal combustion engine enters the partial lift injection region in this embodiment, the fuel injection is performed with the fuel injection divided into the partial lift injection-based micro injection for improving fuel properties and the full lift injection-based main injection. In a case where the correction of the required injection amount Q is required in the partial lift injection region, the correction of the required amount is applied first to the injection amount shared by the full lift injection (F/L injection amount Qf). In a case where a significant amount-decreasing correction of the required injection amount Q is required with the injection amount shared by the full lift injection being exceeded by the lower limit value thereof as a result of the correction, the fuel shared by the full lift injection is injected after division into the plurality of partial injections, and thus an additional amount-decreasing correction with respect to the injection amount shared by the full lift injection exceeded by the lower limit value of the full lift injection becomes possible. Accordingly, the injection amount of the partial lift injection-based micro injection becomes less likely to increase or decrease with respect to the correction of the required injection amount Q and a reduction in the injection accuracy is suppressed.

For the partial lift injection, the range of the injection amount that can be set is narrow. Accordingly, a complex calculation process for seeking a combination of the dividing number and the injection amount so that each of the injection amounts following the division is in the range that can be set becomes necessary when the dividing number and each of the injection amounts following the division are indefinite during the division of the F/L injection amount Qf into the plurality of partial lift injections as described above. Regarding this point, the injection amount of each of the partial lift injections following the division is fixed to the minimum P/L injection amount Qpmin in this embodiment, and thus an increase in the load of the calculation processing for the division can be inhibited.

The sums of the injection amounts preceding and following the division may differ from each other when the injection amount of each of the partial lift injections following the division is fixed. In this case, an adjustment of the injection amount of the partial lift injection-based micro injection, by the injection amount difference between the injection amount shared by the full lift injection prior to the division (F/L injection amount Qf) and the sum of the injection amounts of the partial lift injections following the division (minimum P/L injection amount Qpmin×N), is necessary for the total injection amount of the overall injection to be maintained. However, it is desirable that the amount of the adjustment of the injection amount is minimized because the injection accuracy may be reduced as a result of a change in the injection amount of the partial lift injection. Regarding this point, the injection amount of each of the partial lift injections following the division is fixed to the minimum P/L injection amount Qpmin, which is the lower limit of the injection amount of the partial lift injection, in this embodiment, and thus a reduction in the accuracy of the partial lift injection-based micro injection attributable to the adjustment is suppressed to a minimum level required.

The following effects can be achieved by the fuel injection system for an internal combustion engine according to this embodiment described above. In this embodiment, the micro injection for improving the exhaust properties is performed by the partial lift injection. Accordingly, the micro injection can be performed with a high level of accuracy and the improvement of the exhaust properties can be appropriately performed.

Even in a case where the correction of the required injection amount Q is required, the correction of the required amount is preferentially applied to the injection amount shared by the full lift injection (F/L injection amount Qf). Accordingly, a change in the P/L injection amount Qp depending on the correction of the required injection amount Q, eventually, a reduction in the injection accuracy of the partial lift injection-based micro injection, can be appropriately inhibited.

In a case where the F/L injection amount Qf falls short of the minimum F/L injection amount Qfmin as a result of the correction of the required injection amount. the fuel injection by the F/L injection amount Qf is performed after the division into the plurality of partial lift injections. Accordingly, an amount-decreasing correction of the F/L injection amount Qf exceeded by the minimum F/L injection amount Qfmin can be performed. As a result, even in a case where a significant amount-decreasing correction of the required injection amount Q is required, a change in the P/L injection amount Qp following the correction can be suppressed and a reduction in the accuracy of the micro injection can be inhibited.

The partial lift injection-based fuel injection by the F/L injection amount Qf performed when the F/L injection amount Qf falls short of the minimum F/L injection amount Qfmin is performed by the plurality of partial lift injections at the fixed injection amount. Accordingly, the calculation processing relating to the division of the F/L injection amount Qf to the plurality of partial lift injections can be simplified.

The fixed injection amount described above is the minimum P/L injection amount Qpmin. Accordingly, the difference between the injection amounts preceding and following the division can be inhibited from increasing. In a case where the injection amount difference described above occurs, the P/L injection amount Qp is increased or decreased by the injection amount difference, and thus it is possible to prevent the occurrence of a change in the total injection amount of the overall injection.

Next, a second embodiment of the fuel injection system for an internal combustion engine will be described in detail with reference to the drawings including FIGS. 6A to 6F. The same reference numerals will be used to refer to the parts common to the first and second embodiments, and detailed description thereof will be omitted.

In the first embodiment, both the partial lift injection and the full lift injection in the partial lift injection region are performed by the in-cylinder injection from the in-cylinder injector 30. In the second embodiment, however, the full lift injection of the fuel injection in the partial lift injection region is performed by the port injection from the port injector 20 and the partial lift injection of the fuel injection in the partial lift injection region is performed by the in-cylinder injection from the in-cylinder injector 30.

FIGS. 6A to 6F illustrate a change in the manner of implementation of the fuel injection following the amount-decreasing correction for the required injection amount in the partial lift injection region according to the second embodiment. In FIGS. 6A to 6F, [DI] represents in-cylinder injection and [PFI] represents port injection. In the following description, the [DI] is attached to the end of a sign for the injection amount relating to in-cylinder injection and the [PFI] is attached to the end of a sign for the injection amount relating to port injection so that the types of the injection are distinguished from each other.

Figure 6A:
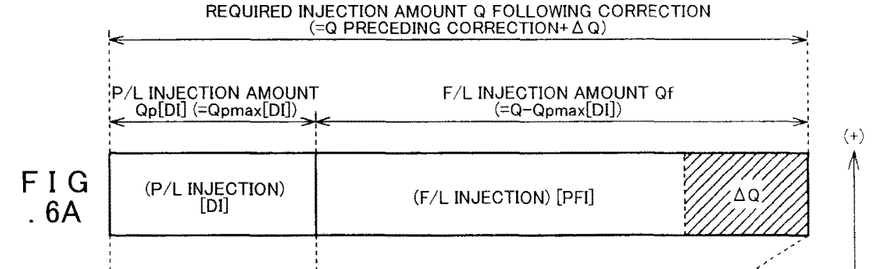
FIGS. 6A to 6F are diagrams illustrating a change in the manner of implementation of fuel injection following an amount-decreasing correction for a required injection amount in a partial lift injection region of a fuel injection system for an internal combustion engine according to a second embodiment.
Figure 6B:
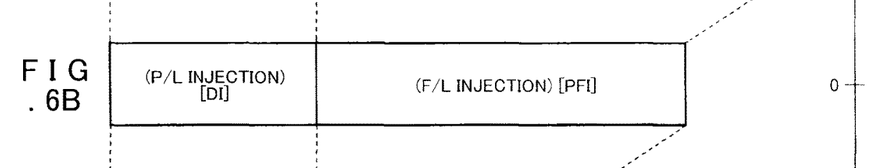

As illustrated in FIG. 6B, each of the P/L injection amount Qp[DI] and the F/L injection amount QF[PFI] is set, so that the sum of the P/L injection amount Qp[D] and the F/L injection amount QF[PFI] becomes equal to the required injection amount Q, in a case where the correction of the required injection amount Q is not required in the partial lift injection region. Then, the partial lift injection by the P/L injection amount Qp[DI] is executed by in-cylinder injection and the full lift injection by the F/L injection amount QF[PFI] is executed by port injection.

Even in the second embodiment, the P/L injection amount Qp[DI] is fixed to the maximum P/L injection amount Qpmax[DI] so that the irregularity is minimized. Accordingly, the injection amount that is obtained by subtracting the maximum P/L injection amount Qpmax[DI] from the required injection amount Q is set for the F/L injection amount QF[PFI] for this case.

Figure 6C:
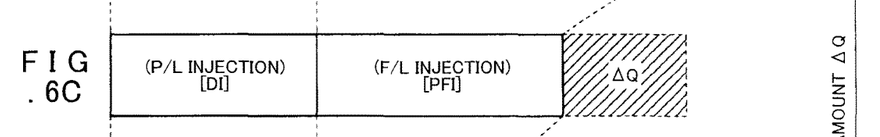

In a case where the correction of the required injection amount Q is required during the operation of the internal combustion engine in the partial lift injection region, the correction of the required amount is preferentially applied to the F/L injection amount Qf[PFI]. In other words, in a case where an amount-increasing correction of the required injection amount Q is required, the F/L injection amount QF[PFI] is increased by the correction amount ΔQ with the P/L injection amount Qp[DI] maintained at the maximum P/L injection amount Qpmax[DI] as illustrated in FIG. 6A. In a case where an amount-decreasing correction of the required injection amount Q is required and the amount of the amount-decreasing correction is not significantly large, the F/L injection amount Qf[PFI] is decreased by the correction amount ΔQ with the P/L injection amount Qp[DI] maintained at the maximum P/L injection amount Qpmax[DI] as illustrated in FIG. 6C.

Figure 6D:
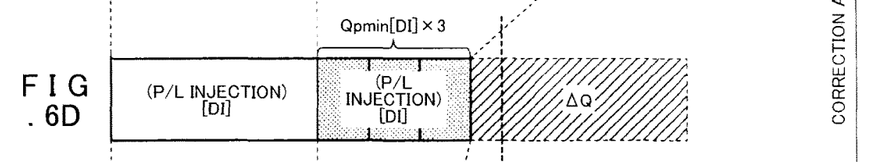
Figure 6E:
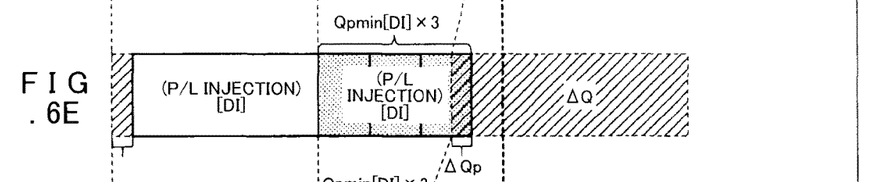

In a case where a significant amount-decreasing correction of the required injection amount Q is required with the F/L injection amount QF[PFI] being exceeded by the minimum F/L injection amount Qfmin[PFI], the F/L injection amount Qf[PFI] of the fuel is injected by a plurality of (three in FIG. 6D) partial lift injections at the minimum P/L injection amount Qpmin[DI] as illustrated in FIG. 6D.

As is the case with the minimum F/L injection amount Qfmin[DI] of the in-cylinder injection, the minimum F/L injection amount Qfmin[PFI] is obtained from the relationship between the energizing time of the port injector 20 and the irregularity of the injection amount of the port injector 20. In other words, the partial lift section in which the needle valve of the port injector 20 does not reach the fully-open state and the full lift section in which the needle valve of the port injector 20 reaches the fully-open state are also present in the energizing time for the port injector 20. The injection amount of the port injector 20 available when the energization is performed for the minimum value of the energizing time during which the irregularity of the injection amount of the port injector 20 in the full lift section becomes equal to or less than the allowable upper limit value is set for the minimum F/L injection amount Qfmin[PFI].

A change in the pressure of the fuel supply is smaller to the port injector 20 than to the in-cylinder injector 30, and thus the minimum F/L injection amount Qfmin[PFI] has a fixed value in this embodiment. In a case where the effect of the change in the pressure of the fuel supply to the port injector 20 cannot be ignored, the minimum F/L injection amount Qfmin[PFI] may be obtained through a sequential calculation based on the pressure of the fuel supply to the port injector 20.

The adjustment of the injection amount following the division in this case is performed by increasing or decreasing the number of the divisions of the partial lift injection. When the F/L injection amount Qf[PFI] is further decreased from the case of FIG. 6D, for example, the number of the partial lift injections at the minimum P/L injection amount Qpmin[DI] is decreased from three times to twice as illustrated in FIG. 6F.

Figure 6F:
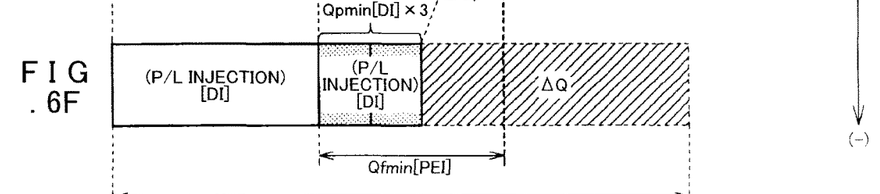

In a case where a difference arises between the total of the injection amount of the partial lift injection at the minimum P/L injection amount Qpmin[DI] of this case (Qpmin[DI]× N) and the F/L injection amount QF[PFI], an adjustment of the P/L injection amount Qp[DI] by the difference based on the P/L injection adjustment amount ΔQp is performed as illustrated in FIG. 6F. Even in this embodiment, the P/L injection amount Qp[DI] preceding the adjustment is set to the maximum P/L injection amount Qpmax[DI] and cannot be adjusted toward the amount-increasing side. Accordingly, the number (dividing number N) of the partial lift injections at the minimum P/L injection amount Qpmin[DI] is set for the total injection amount to become at least the F/L injection amount QF[PFI]. In this manner, the adjustment of the P/L injection amount Qp[DI] in this case is always on the amount-decreasing side.

Effects similar to those achieved by the first embodiment can be achieved by the fuel injection system for an internal combustion engine according to the second embodiment described above. The embodiments described above may also be implemented after modification as follows.

In the embodiments described above, the P/I, injection amount Qp in the partial lift injection region is set to the maximum P/L injection amount Qpmax. However, the P/L injection amount Qp in the partial lift injection region may be set to another injection amount that can be set for the partial lift injection (for example, the minimum P/L injection amount Qpmin). The value of the P/L injection amount Qp may vary, instead of being fixed, depending on the operation situation of the internal combustion engine. In a case where the P/L injection amount Qp is set to a value that can be adjusted on the amount-increasing side, the adjustment of the P/L injection amount Qp in Step S112 of the injection control routine may be performed on the amount-increasing side. In a case where the P/L injection amount Qp has a value that can be adjusted only on the amount-increasing side, the value of the dividing number N needs to be set for the total injection amount of "N" times of the partial lift injection for the injection of the F/L injection amount Qf of the fuel to become equal to or less than the F/L injection amount Qf.

In the embodiments described above, the injection amount of each of the partial lift injections following the division is the minimum P/L injection amount Qpmin when the F/L injection amount Qf is divided into the plurality of partial lift injections. However, the value may be another value within the range of the setting of the injection amount of the partial lift injection. The injection amount of each of the partial lift injections following the division of the F/L injection amount Qf into the plurality of partial lift injections may be obtained by being calculated each time the injection control routine is executed instead of being fixed. For example, the number of the partial lift injections can be determined in advance and the value that is obtained by dividing the F/L injection amount Qf by the number can be the injection amount of each of the partial lift injections. In this case, the sum of the injection amounts of the partial lift injections following the division of the F/L injection amount Qf into the plurality of partial lift injections is always equal to the F/L injection amount Qf. Accordingly, the P/L injection amount Qp does not have to be adjusted. In this case, the F/L injection amount Qf may be unequally divided with respect to the respective partial lift injections.

In the embodiments described above, the minimum P/L injection amount Qpmin, the maximum P/L injection amount Qpmax, and the minimum F/L injection amount Qfmin are obtained by being calculated one after another based on the result of the detection by the fuel pressure sensor 47. However, the minimum P/L injection amount Qpmin, the maximum P/L injection amount Qpmax, and the minimum F/L injection amount Qfmin may have fixed values. Examples of the case where the minimum P/L injection amount Qpmin, the maximum P/L injection amount Qpmax, and the minimum F/L injection amount Qfmin may have fixed values include a case where the effect of a change in the fuel supply pressure of the in-cylinder injector 30 on the injection characteristics thereof is sufficiently small.

In the embodiments described above, the F/L injection amount Qf of the fuel is injected after the division into the plurality of partial lift injections in a case where the F/L injection amount Qf falls short of the minimum F/L injection amount Qfmin as a result of the correction of the required injection amount Q. However, the full lift injection may be performed without the division. In this case, 100% of the fuel may be injected by full lift injection with the partial lift injection-based micro injection stopped.

When the fuel injection in the partial lift injection region is performed only by in-cylinder injection as in the first embodiment and the fuel injection is also performed only by in-cylinder injection in the other operating range, the injection control according to the embodiment described above can be applied, in a similar or analogous manner, to an internal combustion engine in which only an in-cylinder injector is disposed as an injector.

What is claimed is:

1. A fuel injection system for an internal combustion engine, the fuel injection system comprising:
   injectors including needle valves; and
   an electronic control unit programmed to:
   (i) execute partial lift injection with the injectors during which the needle valves do not reach a fully-open state, and execute full lift injection with the injectors during which the needle valves reach the fully-open state;
   (ii) operate the internal combustion engine in a partial lift injection region where the injection of a required injection amount of a fuel is shared by the partial lift injection and the full lift injection; and
   (iii) correct an injection amount of the full lift injection with an amount of correction of the required injection amount while the internal combustion engine is operated in the partial lift injection region.

2. The fuel injection system according to claim 1, wherein the electronic control unit is programmed to set energizing time of the injectors for the execution of the partial lift injection to a maximum value of the partial lift injection when the partial lift injection is performed in the partial lift injection region.

3. The fuel injection system according to claim 1, wherein the electronic control unit is programmed to divide the injection amount of the full lift injection into a plurality of the partial lift injections when the injection amount of the full lift injection is less than of a lower limit value of the injection amount of the full lift injection due to the correction of the required injection amount.

4. The fuel injection system according to claim 3, wherein the electronic control unit is programmed to set the injection amount of each of the partial lift injections to become the lower limit amount of the injection amount of the partial lift injection when the injection amount of the full lift injection is divided into the plurality of partial lift injections.

5. The fuel injection system according to claim 3, wherein the electronic control unit is programmed to adjust a total of the injection amounts of the respective partial lift injections by a difference between the injection amounts when an injection amount difference arises between the injection amount of the full lift injection prior to the division and the total of the injection amounts of the respective partial lift injections following the division when the injection amount of the full lift injection is divided into the plurality of partial lift injections.

6. The fuel injection system according to claim 1, wherein the injectors include a port injector and an in-cylinder injector, the port injector is configured to inject fuel into an intake port and the in-cylinder injector is configured to inject fuel into a cylinder,
   wherein the electronic control unit is programmed to execute the full lift injection by using the port injector, and
   wherein the electronic control unit is programmed to execute the partial lift injection by using the in-cylinder injector.

7. The fuel injection system according to claim 1, wherein the injectors include an in-cylinder injector configured to inject fuel into a cylinder, and
   the electronic control unit is programmed to execute the full lift injection and the partial lift injection by using the in-cylinder injector.

8. A control method for an internal combustion engine, the internal combustion engine including injectors and the injectors including needle valves, the control method comprising:
   executing partial lift injection a during which the needle valves do not reach a fully-open state;
   executing a full lift injection during which the needle valve reaches the fully-open state;
   operating the internal combustion engine in a partial lift injection region where the injection of a required injection amount of a fuel is shared by the partial lift injection and the full lift injection; and
   correcting an injection amount of the full lift injection with an amount of correction of the required injection amount while the internal combustion engine is operated in the partial lift injection region.

* * * * *